(12) United States Patent
Goel et al.

(10) Patent No.: US 9,830,413 B2
(45) Date of Patent: Nov. 28, 2017

(54) SYSTEM AND METHOD FOR ESTIMATING PERFORMANCE, POWER, AREA AND COST (PPAC)

(71) Applicant: TAIWAN SEMICONDUCTOR MANUFACTURING CO., LTD., Hsinchu (TW)

(72) Inventors: Sandeep Kumar Goel, Dublin, CA (US); Tze-Chiang Huang, Saratoga, CA (US); Yun-Han Lee, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 15/201,328

(22) Filed: Jul. 1, 2016

(65) Prior Publication Data
US 2017/0076028 A1  Mar. 16, 2017

Related U.S. Application Data

(60) Provisional application No. 62/218,904, filed on Sep. 15, 2015.

(51) Int. Cl.
*G06F 17/50* (2006.01)
(52) U.S. Cl.
CPC ................ *G06F 17/5036* (2013.01)
(58) Field of Classification Search
CPC .................................................. G06F 17/5036

USPC ......................................................... 716/109
See application file for complete search history.

(56) References Cited

U.S. PATENT DOCUMENTS

| | | | | |
|---|---|---|---|---|
| 2005/0257185 A1* | 11/2005 | Querbach | ............ | G06F 17/5036 716/108 |
| 2007/0204243 A1* | 8/2007 | Ito | ........................ | G06F 17/5018 716/111 |
| 2012/0266122 A1* | 10/2012 | Newcomb | ............ | G06F 17/5036 716/109 |
| 2014/0282326 A1* | 9/2014 | Chen | .................... | G06F 17/5081 716/111 |
| 2017/0076029 A1* | 3/2017 | Huang | ................. | G06F 17/5036 |

* cited by examiner

*Primary Examiner* — Suresh Memula
(74) *Attorney, Agent, or Firm* — Maschoff Brennan

(57) ABSTRACT

A method is disclosed that includes establishing an intellectual property (IP) bank, an application bank, and a technology bank; selecting valid configurations from the IP bank for corresponding IPs and at least one subsystem based on the application data, for generating in response to a user-defined requirement, by a model generator, a performance, power, area and cost (PPAC) model of the valid configurations; based on the PPAC model, creating at least one architecture comprising at least one of the corresponding IPs, and at least one of the valid configurations for the at least one of the corresponding IPs; and, estimating, by a PPAC explorer assessing the technology bank, at least one of a performance value, a power value, an area value and a cost value for a fabrication of the at least one architecture by simulating available fabrication process technology based on the technology bank.

20 Claims, 4 Drawing Sheets

SYSTEM AND METHOD FOR ESTIMATING PERFORMANCE, POWER, AREA AND COST (PPAC)

RELATED APPLICATIONS

This application claims priority to U.S. Provisional Application Ser. No. 62/218,904, filed Sep. 15, 2015, which is herein incorporated by reference.

BACKGROUND

As IC technology advances, the complexity of chips increases and higher performance is required. As the industry moves towards a system on a chip (SoC), uncertainties including, for example, interface requirements and integration of analog blocks need to be addressed and resolved.

As chip complexity increases, the level of risk increases as well. Development cycles increase along with the complexity of the ICs. Accordingly, product manufacturing cycles are delayed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
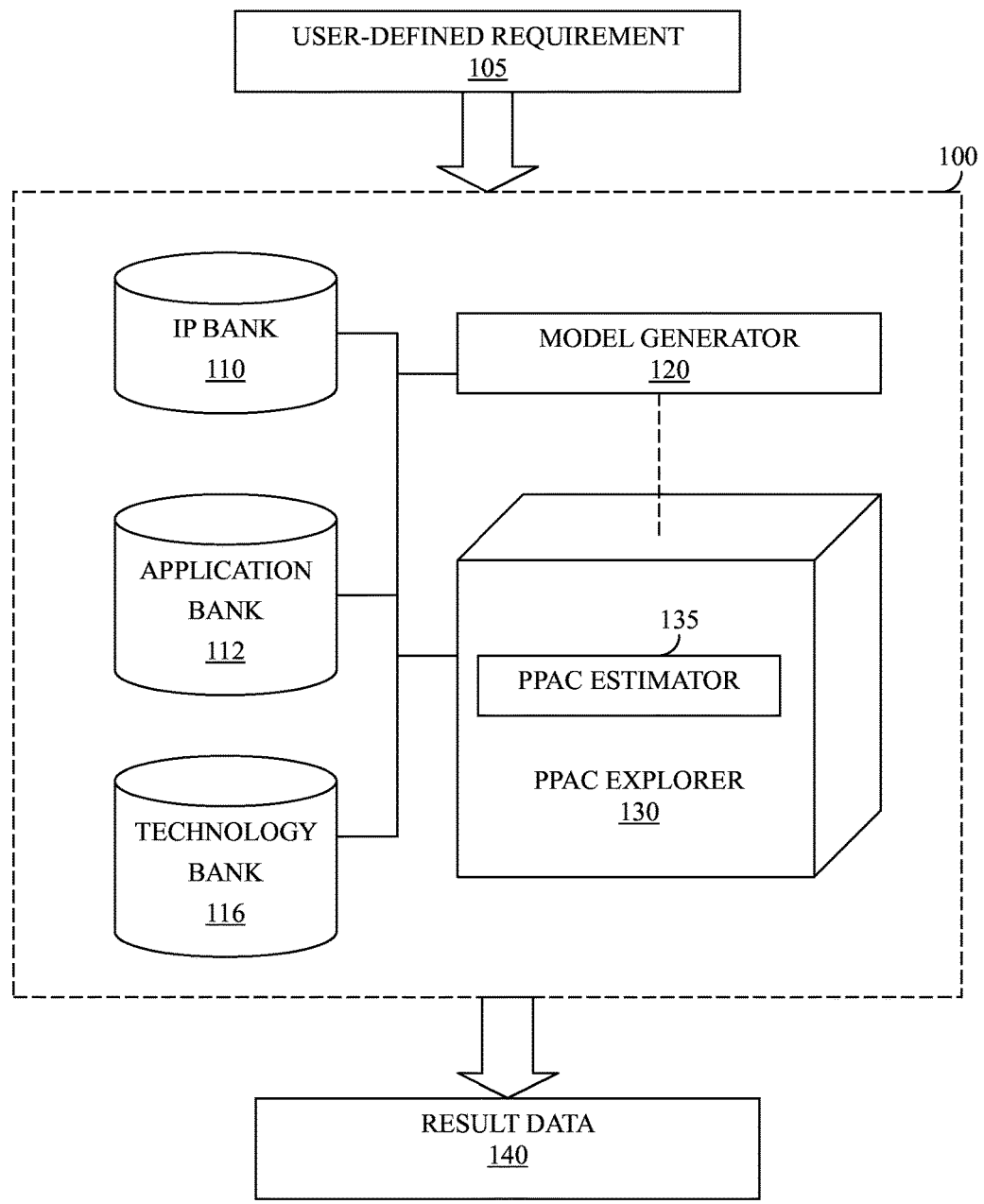
FIG. 1 is a schematic diagram of an integrated platform in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram of an integrated platform 100 in accordance with various embodiments of the present disclosure. In some embodiments, the integrated platform 100 includes, for example, virtual platform, virtual machine (VM), and so forth. For illustration, the integrated platform 100 receives a user-defined requirement 105 and outputs result data 140. The user-defined requirement 105, in some embodiments, corresponds to commands, instructions, signals, and/or the like. In some embodiments, the integrated platform 100 is implemented by a system, a computer, a processing unit, and/or the like.

In some embodiments, the user-defined requirement 105 includes an application requirement and/or a system requirement. The application requirement includes, for example, a set of applications of a product. For instance, the product is a multimedia device, and a set of applications of the multimedia device includes audio playback, video playback, or the like. The system requirement includes, for example, performance, power, area and cost (PPAC) priority of the product. For instance, the product is the multimedia device, and its power requirement indicates that total required energy is lower than a user-defined threshold including, for example, 90 mJ or the like.

In some embodiments, the aforementioned product includes integrated circuit and provides an entire system in one integrated circuit (IC), which is referred to as a system on a chip (SOC) or system on integrated circuit (SOIC) device. The SOC device includes, for example, all of the circuitry configured to implement a cell phone, personal data assistant (PDA), digital VCR, digital camcorder, digital camera, MP3 player, or the like, in a single integrated circuit.

For expediting the development of mask sets for fabricating integrated circuits (ICs), chip designers typically use standard cells from cell libraries. In some embodiments, these standard cells are referred to as "intellectual property (IP)." For illustration, the cells contain geometrical objects including, for example, polygons (boundaries), paths, and/or the like. For simplicity of illustration, the term "IP" is used in the following discussion. Various terms use to indicate the standard cells are within the contemplated scope of the present disclosure.

For illustration, complex and mixed ICs require various analog and/or digital IP components. In most cases, all required IPs come from different sources. With the required IPs, IC manufacturers, fabrication houses and foundries develop process technologies with some considerations including, for example, high performance, low power, small area and low cost, to meet customer requirements. In some embodiments, the integrated platform 100 is configured to estimate the performance, power, area and cost (PPAC), for improvements of processes and/or devices. The estimation of the PPAC, which is performed by the integrated platform 100, will be illustrated below.

For illustration in FIG. 1, an IP bank 110, an application bank 112, a technology bank 116, a model generator 120, and a PPAC explorer 130 are implemented on, or included in, the integrated platform 100.

Figure 2:
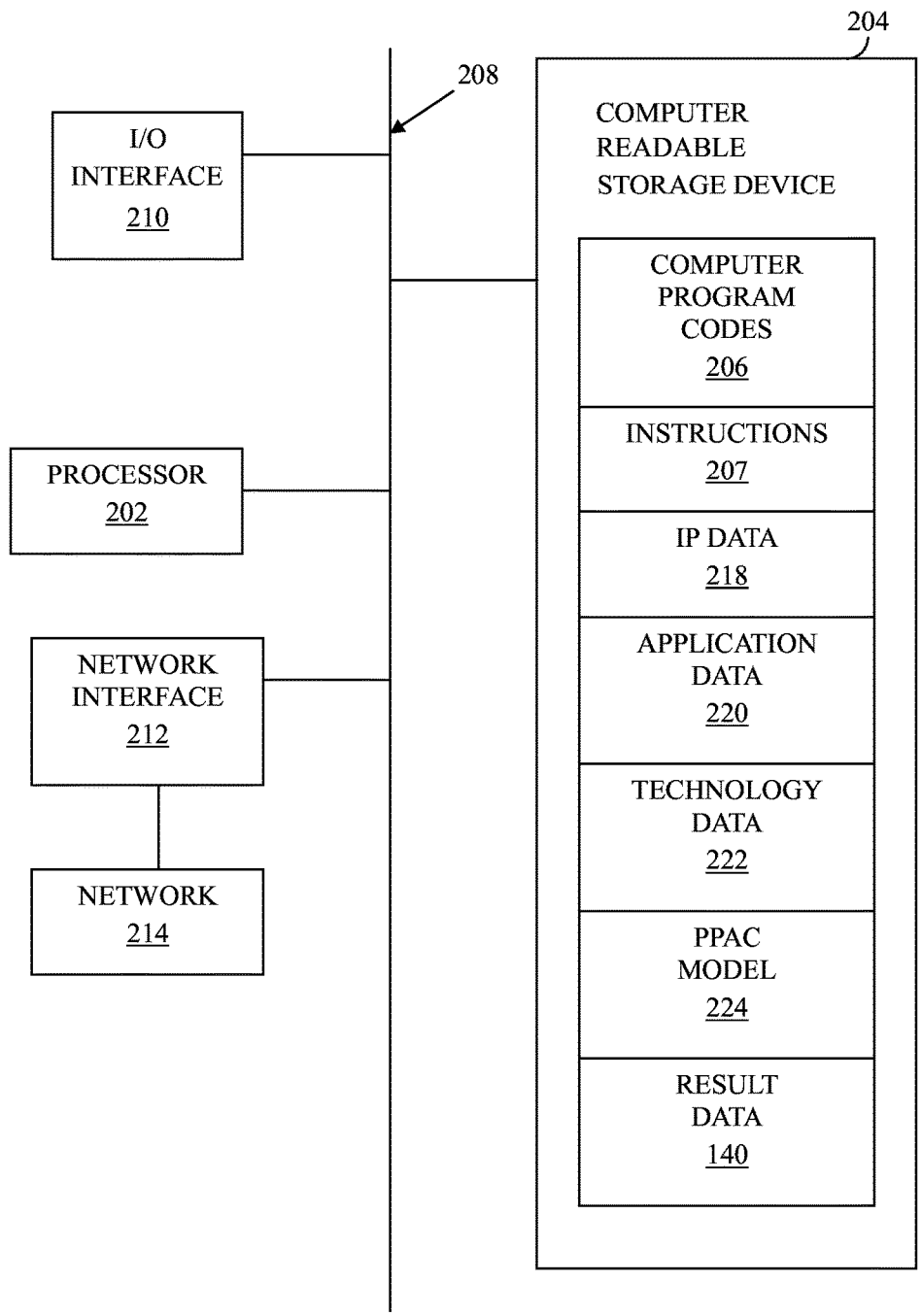
FIG. 2 is a schematic diagram of a system implementing the integrated platform in FIG. 1, in accordance with various embodiments of the present disclosure.

In some embodiments, the IP bank 110 is implemented by hardware which is configured in a storage device 204 as labeled in FIG. 2, for storing data associated with IPs and configurations of the IPs. For illustration, the IP bank 110 stores IP data 218 as labeled in FIG. 2. The IP data 218 in FIG. 2 includes data associated with IPs and configurations of the IPs. In some embodiments, the IPs indicate, or are associated with, various integrated circuits and/or devices, including, for example, analog circuits, logic circuits, mixed signal circuits, radio frequency (RF) devices, memory devices, image sensors, and processor devices. For instance, the processor devices include, for example, ARM A7-C1: Single core (L1: 64 KB, L2: 512 KB), ARM A7-C2: Dual core (L1: 64 KB, L2: 512 KB), ARM A7-C4: Quad core (L1: 64 KB, L2: 512 KB), ARM M3, GPU Mali, and the like. For another instance, the memory devices include, for example, low-power DDR (LPDDR), LPDDR2, LPDDR3, SRAM, and the like. Direct memory access (DMA) is a feature of computer systems that allows certain hardware subsystems to access main system memory (RAM) independently of the central processing unit (CPU).

The aforementioned implementations of the IP bank 110 and the IPs are given for illustrative purposes. Various implementations of the IP bank 110 and the IPs are within the contemplated scope of the present disclosure. For example, in various embodiments, the IP bank 110 is implemented by software, and/or indicates information associated with IPs and configurations thereof.

In some embodiments, the application bank 112 is implemented by hardware which is configured in the storage device 204 in FIG. 2. For illustration, the application bank 112 stores application data 220 as labeled in FIG. 2. The application data 220 in FIG. 2 includes data indicating relations between applications of products and usages of the IPs, in some embodiments. For illustration, the product is a multimedia device. The application of the multimedia device includes, for example, MP3 playback. The usage of the IPs indicates that a processor device ARM M3 and a memory device LPDDR3, as discussed above, perform the functions corresponding to the MP3 playback, in which the processor device ARM M3 directly accesses MP3 data from the memory device LPDDR3. Alternatively, for another illustration, the application of the multimedia device includes MP3 playback, and another usage of the IPs indicates that the processor device ARM M3, memory devices SRAM and LPDDR3, and direct memory access (DMA) operate together to perform the functions corresponding to the MP3 playback. In some embodiments, DMA copies the MP3 data from the memory device LPDDR3 to SRAM, and the processor device ARM M3 access the MP3 data from the memory device SRAM. In some embodiments, DMA is referred to as a feature of computer systems that allow some hardware subsystems to access main system memory independently of central processing unit (CPU).

The aforementioned implementations of the application bank 112 are given for illustrative purposes. Various implementations of the application bank 112 are within the contemplated scope of the present disclosure. For example, in various embodiments, the application bank 112 is implemented by software, and/or indicates relations between applications of products and usages of the IPs.

In some embodiments, the technology bank 116 is implemented by hardware which is configured in the storage device 204 as labeled in FIG. 2. For illustration, the technology bank 116 stores technology data 222 as labeled in FIG. 2. The technology data 222 in FIG. 2 includes data associated with process technology and relevant parameters of fabrications of the IPs. For illustration, the fabrication of the IPs involves various process technology including, for example, fabrication process of 0.25 μm, 0.18 μm, 0.15 μm, 0.13 μm, 0.11 μm, 90 nm, 65 nm, 40 nm, 28 nm or the like. For illustration, the 28-nm process technology includes 28-nm high performance compact mobile computing (28HPC), and the like. In some embodiments, the 28HPC technology is used for mainstream smart phones, DTV, storage and SoC applications. The 28HPC technology enables circuit design to employ smaller die size, less over-design and extraordinary power reduction, compared to those in some approaches.

In some embodiments, the IPs involve various designs including, for example, complementary metal-oxide-semiconductor field effect transistor (CMOSFET), strained CMOSFET, fin-structure FET (FinFET), high-voltage transistor, and the like. Corresponding to the aforementioned designs, relevant semiconductor design parameters include, for example, threshold voltage, breakdown voltage, current consumption, switching speed, and the like.

The aforementioned implementations of the technology bank 11 is given for illustrative purposes. Various implementations of the technology bank 116 are within the contemplated scope of the present disclosure. For example, in various embodiments, the technology bank 116 is implemented by software, and/or indicates information associated with process technology and relevant parameters of the IPs.

As discussed above, the process technology indicates processes of manufacturing, for example, semiconductor devices corresponding to the IPs. In some embodiments, the process technology is associated with, for example, deposition, removal, patterning, and modification of electrical properties (e.g., doping). Deposition is a process, in some embodiments, that grows, coats, and/or transfers a material onto the wafer. Deposition processes include, for example, physical vapor deposition (PVD), chemical vapor deposition (CVD), electrochemical deposition (ECD), molecular beam epitaxy (MBE), atomic layer deposition (ALD), and the like. Removal is a process, in some embodiments, that removes material from the wafer, and that includes, for example, etching processes. For example, removal processes include chemical mechanical planarization (CMP) used to planarize surfaces of semiconductor structures. Patterning, also referred to as lithography, is a process, in some embodiments, that shapes deposited materials. Patterning processes include, for example, using photoresist material to selectively mask portions of semiconductor structures, exposing the semiconductor structures to a particular wavelength of light, and then washing away the unexposed regions with a developer solution. Modification of electrical properties, in some embodiments, includes doping selected regions by diffusion and/or ion implantation. For illustration, the doping processes are followed by an anneal process, including, for example, a furnace anneal or rapid thermal anneal (RTA), in order to activate the implanted dopant.

For illustration in FIG. 1, in response to the received user-defined requirement 105, the model generator 120 generates a PPAC model 224 (as labeled in FIG. 2) at least based on the IP bank 110. In some embodiments, the PPAC model 224 includes a hierarchical PPAC representation for a given IP and/or a given subsystem. In some embodiments, the given IP is associated with at least one integrated circuit. In some embodiments, the subsystem includes at least one processing device including, for example, central processing unit (CPU), digital signal processor (DSP), and the like.

In some embodiments, the PPAC model 224 is associated with a subsystem level, an IP level, and a block level. The subsystem level defines that each subsystem includes IPs as discussed above. The IP level defines that each IP includes blocks (not shown). The block level defines parameters of each block. In some embodiments, each one of the blocks includes technology parameters, implementation parameters, generic parameters, cost parameters, and the like. For illustration, one block in the CPU includes, for example, technology parameters, implementation parameters, generic parameters, cost parameters, and the like.

In some embodiments, the technology parameters discussed above include, for example, parameters associated with metal layers, metal scheme, metal width, metal height, track, gate length, temperature range, core voltage, input/output (I/O) voltage, generic scaling factor, RC corner variation, maturity, and so forth.

In some embodiments, the implementation parameters discussed above include, for example, parameters associated with voltage threshold, operating frequency, power state, gate count, area scaling, typical load, maximum transition time, node switching, transistor switching, RC corner, forward bias, reverse-bias, speed scaling, timing paths, and so forth.

In some embodiments, the generic parameters discussed above include, for example, parameters associated with voltage, temperature, length, width, height, frequency, power, area, and so forth.

In some embodiments, the cost parameters discussed above include, for example, parameters associated with die cost, manufacturing test, parametric tuning, packaging, thermal management, and so forth.

The parameters exemplarily discussed above are given for illustrative purposes. Various parameters are within the contemplated scope of the present disclosure.

In various embodiments, in response to the user-defined requirement 105, the model generator 120 generates the PPAC model 224 as shown in FIG. 2, based on the IP bank 110 and the application bank 112. For illustration in FIG. 1, the model generator 120 is configured to analyze an application requirement of the user-defined requirement 105, and to collect one or more matched applications from the application bank 112 based on the application requirement. In some embodiments, the application requirement includes user-desired functions including, for example, MP3 playback. For illustration, the MP3 playback has features including, for example, 128K bits rate, 4 MB file size, 4 minutes length, and data stored in the memory device LPDDR3 discussed above. Various features in one user-desired function and various user-desired functions are within the contemplated scope of the present disclosure.

According to the matched applications from the application bank 112, the model generator 120 is configured to collect a list of one or more IPs and subsystems. According to the list, the model generator 120 is configured to select valid configurations of the collected IPs, from the IP bank 110. Based on the selected valid configurations, the model generator 120 is configured to generate the PPAC model 224. In some embodiments, the configurations of the IPs indicate specifications of the IPs. For example, the processor devices with various configurations include, for example, ARM A7-C1: Single core (L1: 64 KB, L2: 512 KB), ARM A7-C2: Dual core (L1: 64 KB, L2: 512 KB), ARM A7-C4: Quad core (L1: 64 KB, L2: 512 KB), ARM M3, GPU Mali, and the like, as discussed above.

For further illustration in FIG. 1, the PPAC explorer 130 receives the PPAC model 224 as shown in FIG. 2, from the model generator 120. In some embodiments, based on the PPAC model 224 as shown in FIG. 2, the PPAC explorer 130 accesses the technology bank 116 to simulate one or more corresponding fabrication processes for at least one architecture. In some embodiments, the architecture indicates configurations and/or electrical characteristics of integrated circuits of the product.

In some embodiments, the PPAC explorer 130 includes a PPAC estimator 135. The PPAC estimator 135 is configured to estimate a performance value, a power value, an area value, a cost value, or the combination thereof, for the architecture as discussed above, based on the PPAC model 224. Based on at least one of the estimated values, the PPAC estimator 135 removes at least one defective architecture that does not meet the user-defined requirement 105.

After the PPAC explorer 130 removes the defective architecture, the integrated platform 100 outputs the result data 140 for analysis and/or evaluation. In some embodiments, the result data 140 includes architecture-technology configuration ranking corresponding to the PPAC, the PPAC estimation, and so forth. In various embodiments, the result data 140 is used for early estimation of the product before the product is designed and/or manufactured.

FIG. 2 is a schematic diagram of a system 200 implementing the integrated platform 100 of FIG. 1, in accordance with some embodiments of the present disclosure. Labels for different components of the system 200 are illustratively shown in FIG. 2. In some embodiments, the system 200 is implemented in or by a computer that implements the integrated platform 100 of FIG. 1. Various devices to implement the system 200 are within the contemplated scope of the present disclosure.

For illustration, the system 200 includes a processor 202 and a non-transitory computer readable storage device 204 storing computer program codes 206. The processor 202 is configured to execute the computer program codes 206 stored in the computer readable storage device 204, in order for performing operations, for example, as illustrated in FIG. 3 and FIG. 4.

Figure 3:
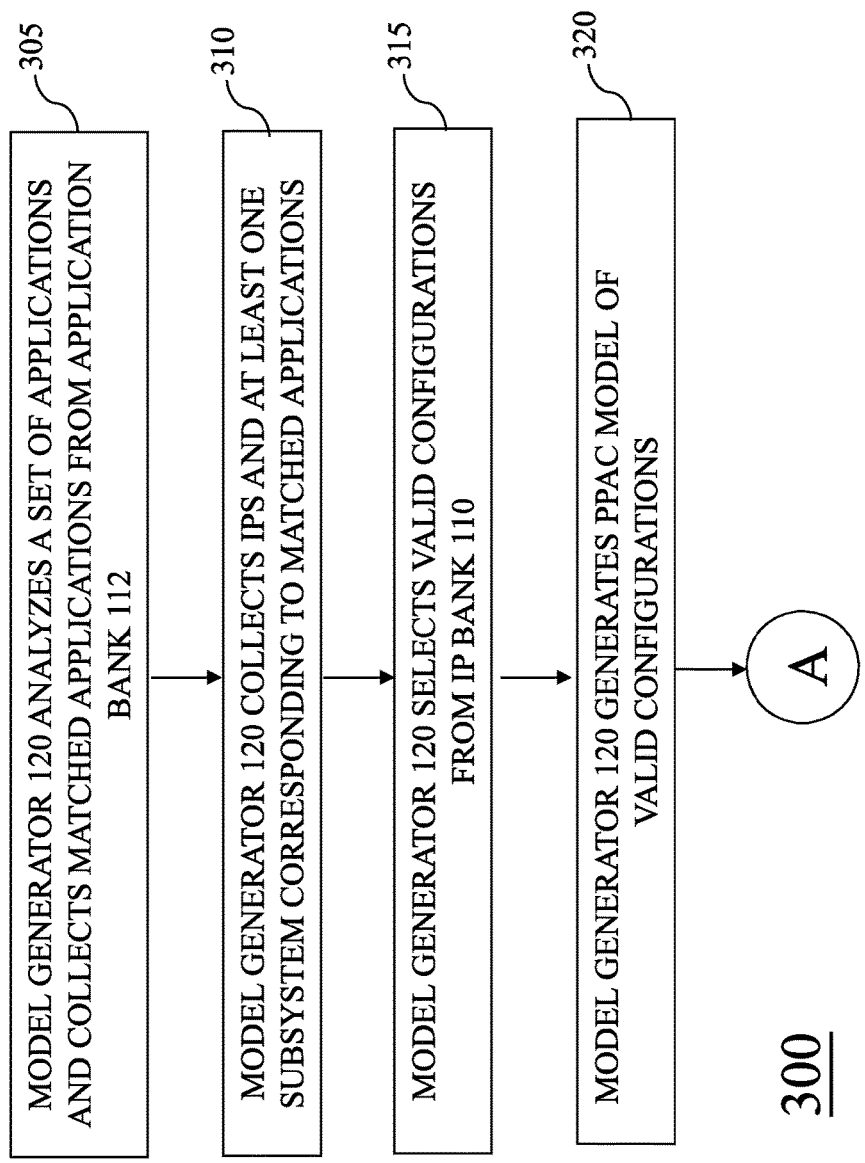
FIG. 3 and FIG. 4 illustrate a flow chart of a method 300 performed by the system 200 of FIG. 2, in accordance with various embodiments of the present disclosure.
Figure 4:
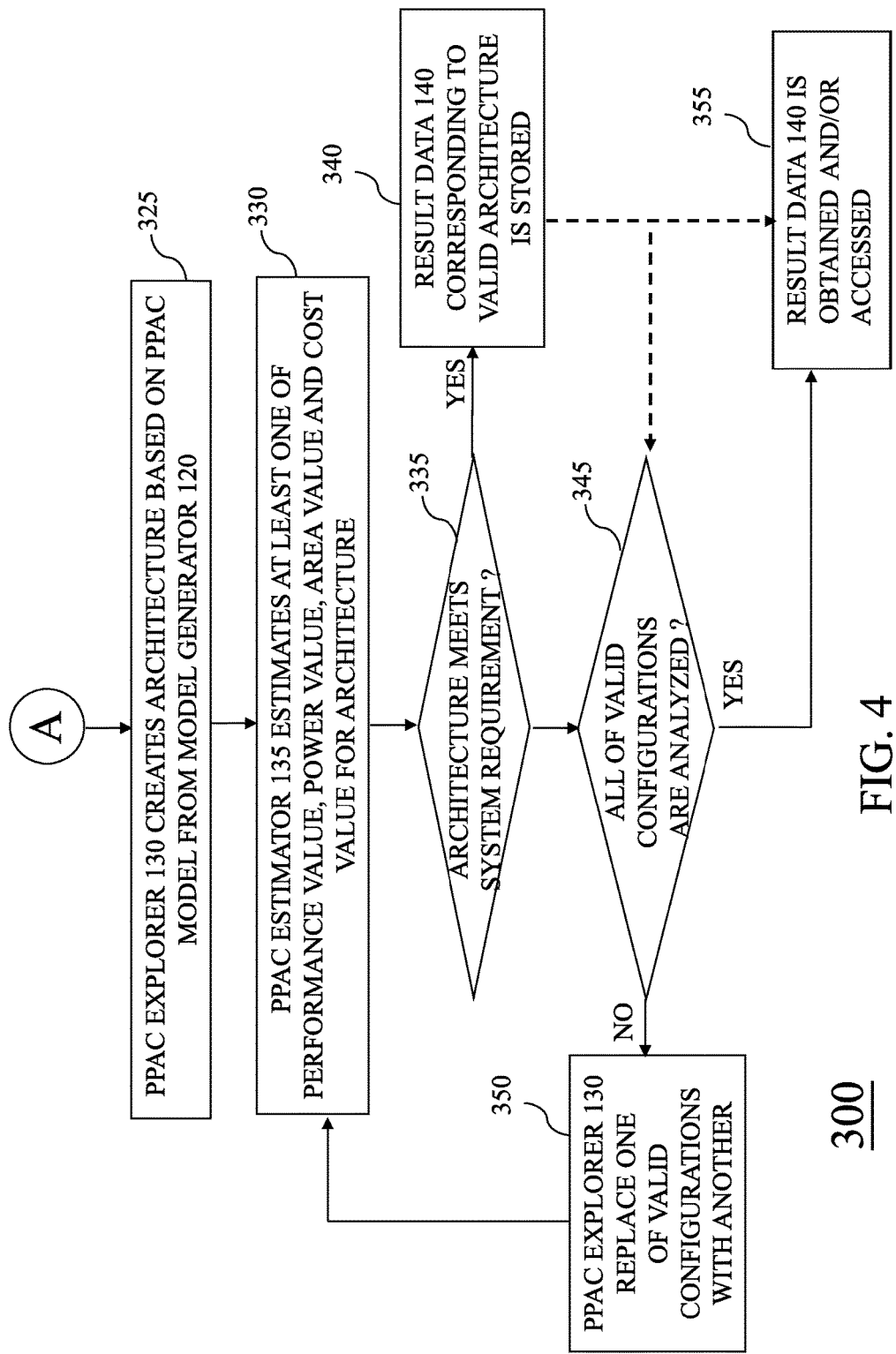

In some embodiments, the computer readable storage device 204 stores the computer program codes 206 for performing operations including operations in FIG. 3 and FIG. 4. In various embodiments, the computer readable storage device 204 also stores various data, in addition to the computer program codes 206, for performing operations including, for example, operations in FIG. 3 and FIG. 4.

In alternative embodiments, the computer readable storage device 204 also stores data generated, and/or required, during performing operations including, for example, operations in FIG. 3 and FIG. 4. For illustration, the data generated, and/or required, during performing operations in FIG. 3 and FIG. 4 include IP data 218, application data 220, technology data 222, PPAC model 224 and/or a set of executable instructions, as will be illustrated below.

For illustration in FIG. 2 with reference to FIG. 1, in response to the user-defined requirement 105, the processor 202 is configured to execute the computer program codes 206, in order to perform operations and/or functions of the model generator 120, the PPAC explorer 130, and/or the PPAC estimator 135 as illustrated in FIG. 1.

For illustration, according to the user-defined requirement 105 in FIG. 1, the processor 202 executes the computer program codes 206 to utilize at least a portion of the IP data 218 and the application data 220 for generating the PPAC model 224. In some embodiments, the PPAC model 224 includes a database (not shown) having application specification, technology specification and design specification.

In some embodiments, based on the PPAC model 224, the processor 202 executes the computer program codes 206 to create at least one architecture (not shown). As discussed above, in some embodiments, the architecture indicates configurations and/or electrical characteristics of integrated circuits of the product. In some embodiments, the architecture includes a number of the IPs as discussed above.

In some embodiments, the processor 202 further executes the computer program codes 206 to estimate a performance value, a power value, an area value, a cost value, or the combination thereof, for the created architecture. In some embodiments, the performance value, the power value, the area value, the cost value, or the combination thereof, is estimated by simulating at least one corresponding fabrication process based on the technology data 222. In some embodiments, the technology data 222 includes data related to process technology and relevant parameters of fabrication of the IPs. For illustration, fabrication processes, which are associated with the IPs and applications corresponding to the user-defined requirement 105, are simulated. With the simulation result, the performance value, the power value, the area value, the cost value, or the combination thereof, is estimated. Based on the estimated values, at least one defective architecture that does not meet the user-defined requirement 105 is able to be identified and/or to be removed.

In some embodiments, the processor 202 is implemented by, for example, a central processing unit (CPU), a multi-processor, a distributed processing system, an application specific integrated circuit (ASIC), a suitable processing unit, or the like. The aforementioned circuits or units to implement the processor 202 are given for illustrative purposes. Various circuits or units to implement the processor 202 are within the contemplated scope of the present disclosure.

In some embodiments, the computer readable storage device 204 is implemented by, for example, electronic device, magnetic device, optical device, electromagnetic device, infrared device, semiconductor device (or apparatus), or the like. For example, the computer readable storage device 204 includes a semiconductor memory, a magnetic tape, a removable computer diskette, a random access memory (RAM), a read-only memory (ROM), a rigid magnetic disk, an optical disk, or the like. For illustration of the computer readable storage device 204 including optical disks, the computer readable storage device 204 includes, for example, a compact disk-read only memory (CD-ROM), a compact disk-read/write (CD-R/W), a digital video disc (DVD), or the like.

In some embodiments, the computer readable storage device 204 also stores instructions 207 for interfacing with external machines and/or equipments. In some embodiments, the processor 202 executes the instructions 207 to generate commands and/or instructions read by manufacturing equipments for fabricating semiconductor devices based on the result data 140.

In some embodiments, the processor 202 is electrically coupled to the computer readable storage device 204 via a bus 208. The processor 202 is able to communicate with the computer readable storage device 204 via the bus 208.

Moreover, in some embodiments, the processor 202 also communicates with various peripheral apparatuses and/or external equipments via the bus 208. For illustration in FIG. 2, the processor 202 is electrically coupled to an I/O interface 210 via the bus 208. The I/O interface 210 is electrically coupled to peripheral apparatuses, including, for example, a display (not shown). The display is implemented by, for example, a cathode ray tube (CRT), liquid crystal display (LCD), or the like. Accordingly, the processor 202 is able to communicate with the display through the I/O interface 210. Through the I/O interface 210, the processor 202 also communicates information and/or commands with other peripheral apparatuses including, for example, keyboard, keypad, mouse, trackball, track-pad, touch screen, cursor direction keys, or the like. The aforementioned peripheral apparatuses are given for illustrative purposes. Various peripheral apparatuses are within the contemplated scope of the present disclosure.

In some embodiments, the processor 202 is also electrically coupled to a network interface 212 via the bus 208, to access a network 214 through the network interface 212. Through the network 214, the processor 202 and the computer readable storage device 204 are able to communicate with external equipments and/or equipments connected to the network 214. In some embodiments, through the network 214, the network interface 212 receives the user-defined requirement 105 as illustrated in FIG. 1. In some other embodiments, the I/O interface 210 receives the user-defined requirement 105.

The network interface 212, in some embodiments, is implemented by wireless network interfaces and/or wired network interfaces. The wireless network interfaces include, for example, BLUETOOTH, WIFI, WIMAX, GPRS, WCDMA, or the like. The wired network interfaces include, for example, ETHERNET, USB, IEEE-1394, or the like.

The configuration of the system 200 in FIG. 2 is given for illustrative purposes. Various configurations of the system 200 are within the contemplated scope of the present disclosure. For example, in various embodiments, the computer readable storage device 204 is implemented by a non-transitory computer readable storage medium that is encoded with the aforementioned executable instructions and/or computer program codes for carrying out operations, for example, as will be illustrated in FIG. 3 and FIG. 4.

FIG. 3 and FIG. 4 illustrate a flow chart of a method 300 performed by the system 200 of FIG. 2, in accordance with various embodiments of the present disclosure. Given for illustrative purposes, the method 300 is performed with the integrated platform 100 in FIG. 1, by the system 200 in FIG. 2. Various platforms and systems for performing the method 300 are within the contemplated scope of the present disclosure. For ease of understanding, the method 300 is discussed below with reference to FIG. 1 and FIG. 2.

For illustration in FIG. 3, in operation 305, in response to the user-defined requirement 105 in FIG. 1, the model generator 120 analyzes a set of applications. Correspondingly in FIG. 2, the processor 202 executes the computer program codes 206 to analyze the application data 220 corresponding to a set of applications, to determine matched application data. In various embodiments, the processor 202 also executes the computer program codes 206 to identify the matched application data from the analyzed application data 220.

Furthermore in operation 305, the model generator 120 also collects the matched applications from the application bank 112. Correspondingly in FIG. 2, the processor 202 executes the computer program codes 206 to collect the matched application data from the application data 220.

In operation 310, based on the matched applications, the model generator 120 collects IPs and at least one subsystem that includes at least one processing device as discussed above, which correspond to the matched applications. Correspondingly in FIG. 2, based on the matched application data from the application data 220, the processor 202 executes the computer program codes 206 to collect data corresponding to IPs and at least one subsystem. The subsystem with the IPs is configured to perform the matched applications. The IPs, in some embodiments, are included in the subsystem, or in alternative embodiments, are outside and electrically coupled to the subsystem.

In operation 315, based on the IPs, the model generator 120 selects valid configurations of the IPs, as discussed above, from the IP bank 110. Correspondingly in FIG. 2, according to the data corresponding to the IPs and the subsystem, the processor 202 executes the computer program codes 206 to select data corresponding to the valid configurations, from the IP data 218.

In operation 320, the model generator 120 generates the PPAC model of the valid configurations. Correspondingly in FIG. 2, based on the data corresponding to the valid configurations, the processor 202 executes the computer program codes 206 to generate the PPAC model 224. The PPAC model 224, in some embodiments, is a hierarchical model associated with the subsystem level, the IP level, and the block level, as discussed above.

For illustration in FIG. 4, in operation 325, the PPAC explorer 130 in FIG. 1 creates an architecture based on the PPAC model generated by the model generator 120. Correspondingly in FIG. 2, the processor 202 executes the computer program codes 206 to generate data corresponding to an architecture based on the PPAC model 224.

In some embodiments, the created architecture is an initial architecture. In further embodiments, the initial architecture has a smallest number of the IPs with a corresponding valid configuration of the valid configurations. For illustration, when the application requirement indicates MP3 playback that, for example, has 128 K bits rate, 4 MB file size, 4 minutes length, and stores data in the memory device LPDDR3, the initial architecture defines that the processor device ARM M3 accesses data from the memory device LPDDR3. The application requirement and initial architecture discussed above are given for illustrative purposes. Various application requirements and initial architectures are within the contemplated scope of the present disclosure.

In operation 330, the PPAC estimator 135 estimates at least one of a performance value, a power value, an area value and a cost value for a fabrication of the created architecture. Correspondingly in FIG. 2, the processor 202 executes the computer program codes 206 to estimate the generated data associated with at least one of a performance value, a power value, an area value and a cost value, for the created architecture, by simulating available fabrication process technology as discussed above, based on the technology data 222. In some embodiments, the PPAC estimator 135 estimates values of parameters including, for example, leakage power (PL), internal transistor power, node switching power, performance for same technology with different voltage threshold distribution, and the like.

In operation 335, according to the estimation result generated in operation 330, the PPAC explorer 130 determines whether the created architecture meets the system requirement based on the user-defined requirement 105. Correspondingly in FIG. 2, the processor 202 executes the computer program codes 206 to determine whether the generated data corresponding to the created architecture is matched with data corresponding to the system requirement. In some embodiments, when the created architecture meets the system requirement, the PPAC explorer 130 defines the created architecture as a valid architecture. When the created architecture does not meet the system requirement, the PPAC explorer 130 defines the created architecture as a defective architecture.

In operation 340, when the created architecture meets the system requirement, the result data 140 corresponding to the created architecture (i.e., the valid architecture) is stored, for illustration, in the computer readable storage device 204.

When the created architecture does not meet the system requirement, operation 345 is performed. In operation 345, the PPAC explorer 130 determines whether all of the valid configurations are analyzed. Correspondingly in FIG. 2, the processor 202 executes the computer program codes 206 to determine whether all of data corresponding to the valid configurations are analyzed.

When all of the valid configurations are not analyzed, operation 350 is performed. In operation 350, the PPAC explorer 130 replaces one of the aforementioned valid configurations with another valid configuration, in order to create a substitute architecture. Correspondingly in FIG. 2, the processor 202 executes the computer program codes 206 to replace the data corresponding to one valid configuration, with data corresponding to another valid configuration. Accordingly, the substitute architecture is created. For illustration, when the application requirement indicates MP3 playback that, for example, has 128 K bits rate, 4 MB file size, 4 minutes length, and stores data in the memory device LPDDR3, the substitute architecture defines that direct memory access (DMA) is used to copy the data from the memory device LPDDR3 to the memory device SRAM, and then the processor device ARM M3 accesses data from the memory device SRAM. Alternatively stated, compared to the initial architecture discussed above, the substitute architecture defines a different mechanism including a different number of IPs with different operations.

The application requirement and architecture discussed above are given for illustrative purposes. Various application requirements and architectures are within the contemplated scope of the present disclosure.

After operation 350, operation 330 is performed again, in which the PPAC estimator 135 estimates at least one of a performance value, a power value, an area value and a cost value for the substitute architecture. The operations 330, 335, 345 and 350 are performed in an iterative manner, until all of the valid configurations are analyzed or the architecture meets the system requirement.

When all of the valid configurations are analyzed, operation 355 is performed. In operation 355, the result data 140 is obtained and/or accessed, for illustration, through the system 200. In some embodiments, the result data 140 is obtained and/or displayed through the I/O interface 210 in FIG. 2. In some other embodiments, the result data 140 is obtained and/or accessed through the network interface 212 and the network in FIG. 2.

In various embodiments, after operation 340, operation 345 is further performed in order to check whether all of the valid configurations are analyzed. In alternative embodiments, after operation 340, operation 355 is further performed in order to obtain and/or access the result data 140.

In related approaches, register transfer level (RTL) design, which describes behaviors of digital circuits on chips, needs to be performed at first. Afterwards, a physical design, which takes the RTL design and a library of available logic gates, is performed to create a chip design. Accordingly, a complete RTL-to-physical implementation is required in the related approaches. However, the complete RTL-to-physical implementation is time-consuming and very costly.

Compared to the related approaches, the method 300 and/or the integrated platform 100 in the present disclosure is used for an estimation of performance, power, area and cost (PPAC), in order to explore various system configurations in conjunction with various technologies. A complete RTL-to-physical implementation is not required, because the method 300 and/or the integrated platform 100 is able to be used to substitute the RTL-to-physical implementation, in order for a fast and accurate estimation of performance, power, area and cost (PPAC). As a result, time and cost are reduced.

The above illustrations in FIG. 3 and FIG. 4 include exemplary operations, but the operations are not necessarily performed in the order shown. Operations may be added, replaced, changed order, and/or eliminated as appropriate, in accordance with the spirit and scope of various embodiments of the present disclosure. For example, in additional embodiments, according to the result data 140, all valid architectures that meet the user-defined requirement 105 are ranked for identification and/or analysis. Correspondingly in FIG. 2, the processor 202 executes the computer program codes 206 to generate ranking data corresponding to all valid architectures.

In some embodiments, a system is disclosed that includes a storage device and a processor. The storage device is configured to store intellectual property (IP) data, application data, and technology data. The processor is electrically coupled with the storage device and programmed to: obtain the IP data and the application data from the storage device; select valid configurations from the IP data for corresponding IPs and at least one subsystem based on the application data, to generate a performance, power, area and cost (PPAC) model of the valid configurations; based on the PPAC model, generate data corresponding to at least one architecture comprising at least one of the corresponding IPs, and at least one of the valid configurations for the at least one of the corresponding IPs; obtain the technology data from the storage device; and, estimate the generated data associated with at least one of a performance value, a power value, an area value and a cost value for a fabrication of the at least one architecture by simulating available fabrication process technology based on the technology data.

Also disclosed is a non-transitory computer readable medium including computer executable instructions which, when executed by a processor, cause the processor for carrying out a method, the method comprising at least one of: selecting valid configurations from IP data for corresponding IPs and at least one subsystem based on the application data, for generating a performance, power, area and cost (PPAC) model of the valid configurations; based on the PPAC model, creating at least one architecture comprising at least one of the corresponding IPs, and at least one of the valid configurations for the at least one of the corresponding IPs; and, estimating at least one of a performance value, a power value, an area value and a cost value for a fabrication of the at least one architecture by simulating available fabrication process technology based on technology data.

Also disclosed is a method is disclosed that includes establishing an intellectual property (IP) bank, an application bank, and a technology bank; selecting valid configurations from the IP bank for corresponding IPs and at least one subsystem based on the application bank, for generating in response to a user-defined requirement, by a model generator, a performance, power, area and cost (PPAC) model of the valid configurations; based on the PPAC model, creating at least one architecture comprising at least one of the corresponding IPs, and at least one of the valid configurations for the at least one of the corresponding IPs; and, estimating, by a PPAC explorer assessing the technology bank, at least one of a performance value, a power value, an area value and a cost value for a fabrication of the at least one architecture by simulating available fabrication process technology based on the technology bank.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a storage device configured to store intellectual property (IP) data, application data, and technology data;
a processor electrically coupled with the storage device and programmed to:
obtain the IP data and the application data from the storage device;
select valid configurations from the IP data for corresponding IPs and at least one subsystem based on the application data, to generate a performance, power, area and cost (PPAC) model of the valid configurations;
based on the PPAC model, generate data corresponding to at least one architecture comprising at least one of the corresponding IPs, and at least one of the valid configurations for the at least one of the corresponding IPs;
obtain the technology data from the storage device; and
estimate the generated data associated with at least one of a performance value, a power value, an area value and a cost value for a fabrication of the at least one architecture by simulating available fabrication process technology based on the technology data.

2. The system of claim 1, wherein the IP data comprises data associated with IPs and configurations of the IPs, the application data comprises data associated with a relation between applications of products and usages of the IPs, and the technology data comprises data associated with process technology and relevant parameters of fabrication of the IPs.

3. The system of claim 1, wherein the processor is further programmed to:
analyze the application data corresponding to a set of applications, and collect the matched application data from the application data;
based on the matched application data, collect data corresponding to the corresponding IPs and the at least one subsystem; and
from the IP data, select data corresponding to the valid configurations.

4. The system of claim 3, wherein the at least one architecture has a smallest number of the IPs, and one of the valid configurations for the IPs.

5. The system of claim 1, wherein the PPAC model is associated with a subsystem level, an IP level, and a block level, wherein the subsystem level defines that each subsystem includes IPs, the IP level defines that each IP includes blocks, and the block level defines parameters of each block.

6. The system of claim 1, wherein the processor is further programmed to:
determine whether the generated data corresponding to the at least one architecture is matched with data corresponding to a system requirement.

7. The system of claim 6, wherein the processor is further programmed to:
when the generated data corresponding to the at least one architecture is matched with data corresponding to the system requirement, define the generated data as data corresponding to a valid architecture.

8. The system of claim 6, wherein when the at least one architecture does not meet the system requirement, the processor replaces one of the valid configurations associated with the IPs, to create another architecture.

9. A non-transitory computer readable medium comprising computer executable instructions which, when executed by a processor, cause the processor for carrying out a method, the method comprising at least one of:
  selecting valid configurations from IP data for corresponding IPs and at least one subsystem based on the application data, for generating a performance, power, area and cost (PPAC) model of the valid configurations;
  based on the PPAC model, creating at least one architecture comprising at least one of the corresponding IPs, and at least one of the valid configurations for the at least one of the corresponding IPs; and
  estimating at least one of a performance value, a power value, an area value and a cost value for a fabrication of the at least one architecture by simulating available fabrication process technology based on technology data.

10. The non-transitory computer readable medium of claim 9, wherein the IPs are associated with various integrated circuits.

11. The non-transitory computer readable medium of claim 9, wherein the method further comprises:
  analyzing an application requirement and collecting at least one matched application from the applications; and
  based on the at least one matched application, collecting the corresponding IPs and the at least one subsystem.

12. The non-transitory computer readable medium of claim 11, wherein the at least one architecture has a smallest number of the IPs, and one of the valid configurations for the IPs.

13. The non-transitory computer readable medium of claim 9, wherein the PPAC model is associated with a subsystem level, an IP level, and a block level, wherein the subsystem level defines that each subsystem includes IPs, the IP level defines that each IP includes blocks, and the block level defines parameters of each block.

14. The non-transitory computer readable medium of claim 9, wherein the method further comprises:
  according to the at least one of the performance value, the power value, the area value and the cost value, determining whether the at least one architecture meets a system requirement.

15. The non-transitory computer readable medium of claim 14, wherein the method further comprises:
  when the at least one architecture meets the system requirement, defining the at least one architecture as a valid architecture.

16. The non-transitory computer readable medium of claim 14, wherein the method further comprises:
  when the at least one architecture does not meet the system requirement, replacing one of valid configurations associated with the IPs, to create another architecture.

17. A method comprising:
  establishing an intellectual property (IP) bank, an application bank, and a technology bank;
  selecting valid configurations from the IP bank for corresponding IPs and at least one subsystem based on the application bank, for generating in response to a user-defined requirement, by a model generator, a performance, power, area and cost (PPAC) model of the valid configurations;
  based on the PPAC model, creating at least one architecture comprising at least one of the corresponding IPs, and at least one of the valid configurations for the at least one of the corresponding IPs; and
  estimating, by a PPAC explorer assessing the technology bank, at least one of a performance value, a power value, an area value and a cost value for a fabrication of the at least one architecture by simulating available fabrication process technology based on the technology bank.

18. The method of claim 17, wherein the IP bank is configured to store data associated with IPs and configurations of the IPs, the application bank is configured to store data associated with applications of the IPs, and the technology bank is configured to store data associated with process technology and relevant parameters of the IPs.

19. The method of claim 17, further comprising:
  based on at least one matched application from the application bank, collecting the corresponding IPs and the at least one subsystem.

20. The method of claim 19, further comprising:
  according to the at least one of the performance value, the power value, the area value and the cost value, determining whether the at least one architecture meets a system requirement.

* * * * *